US012688553B2

(12) United States Patent
Sah et al.

(10) Patent No.: US 12,688,553 B2
(45) Date of Patent: Jul. 21, 2026

(54) SYSTEM AND METHOD TO UTILIZE A REDUCED IMAGE RESOLUTION FOR COMPUTER VISION APPLICATIONS

(71) Applicant: Deeplite Inc., Montréal (CA)

(72) Inventors: Sudhakar Sah, Markham (CA); Ivan Lazarevich, Toronto (CA); Ahmadreza Jeddi, North York (CA); Honnesh Rohmetra, Mississauga (CA); Ehsan Saboori, Richmond Hill (CA)

(73) Assignee: Deeplite Inc., Montréal (CA)

( * ) Notice: Subject to any disclaimer, the term of this patent is extended or adjusted under 35 U.S.C. 154(b) by 314 days.

(21) Appl. No.: 18/358,424

(22) Filed: Jul. 25, 2023

(65) Prior Publication Data

US 2024/0037702 A1　Feb. 1, 2024

Related U.S. Application Data

(60) Provisional application No. 63/369,471, filed on Jul. 26, 2022.

(51) Int. Cl.
| | |
|---|---|
| *G06T 3/4053* | (2024.01) |
| *G06T 5/20* | (2006.01) |
| *G06V 10/80* | (2022.01) |

(52) U.S. Cl.
CPC .............. *G06T 3/4053* (2013.01); *G06T 5/20* (2013.01); *G06V 10/806* (2022.01)

(58) Field of Classification Search
CPC ... G06T 3/4053; G06T 3/4046; G06V 10/806; G06V 10/255; G06V 10/454
See application file for complete search history.

(56) References Cited

U.S. PATENT DOCUMENTS

| | | | |
|---|---|---|---|
| 7,885,455 B2 | 2/2011 | Liu et al. | |
| 2019/0355113 A1* | 11/2019 | Wirch | ........................ G06T 7/32 |
| 2022/0188973 A1* | 6/2022 | Puttagunta | ............ G06T 3/4038 |

FOREIGN PATENT DOCUMENTS

| | | | | |
|---|---|---|---|---|
| CN | 110728658 | 1/2020 | | |
| CN | 112347945 | 2/2021 | | |
| WO | WO-2023229589 A1 * | 11/2023 | ........... | G06T 3/4053 |

OTHER PUBLICATIONS

Component Attention Guided Face Super-Resolution Network: CAGFace Ratheesh Kalarot, Tao Li, Fatih Porikli; Proceedings of the IEEE/CVF Winter Conference on Applications of Computer Vision (WACV), 2020, pp. 370-380 (Year: 2020).*

(Continued)

*Primary Examiner* — Andrew M Moyer
*Assistant Examiner* — Conor A O'Malley
(74) *Attorney, Agent, or Firm* — Crowe & Dunlevy LLC

(57) ABSTRACT

A system, device and method are provided for generating image processing models for selected hardware. The method, illustratively, includes obtaining a reference model, a desired image resolution based on target hardware, and a training set of images comprising images with the desired image resolution and images with a higher resolution. The method includes generating an updated model by: iteratively training the reference model with a combined set of features, the combined set of features comprising features determined from the images with the higher resolution with at least one stem and features determined from the images with the desired resolution. The method includes outputting the trained updated model to the target hardware to process images with the desired image resolution.

16 Claims, 6 Drawing Sheets

(56) References Cited

OTHER PUBLICATIONS

International Search Report Issued in related PCT Application No. PCT/CA2023/050991; search dated Sep. 25, 2023.

Bochkovskiy, Alexey, Chien-Yao Wang, and Hong-Yuan Mark Liao. "Yolov4: Optimal speed and accuracy of object detection." arXiv preprint arXiv:2004.10934 (2020).

Sajjadi, Mehdi SM, Raviteja Vemulapalli, and Matthew Brown. "Frame-recurrent video super-resolution." In Proceedings of the IEEE Conference on Computer Vision and Pattern Recognition, pp. 6626-6634. 2018.

Ridnik, Tal, Hussam Lawen, Asaf Noy, Emanuel Ben Baruch, Gilad Sharir, and Itamar Friedman. "Tresnet: High performance gpu-dedicated architecture." In Proceedings of the IEEE/CVF Winter Conference on Applications of Computer Vision, pp. 1400-1409. 2021.

Sandler, Mark, Jonathan Baccash, Andrey Zhmoginov, and Andrew Howard. "Non-discriminative data or weak model? on the relative importance of data and model resolution." In Proceedings of the IEEE/CVF International Conference on Computer Vision Workshops, pp. 0-0. 2019.

Zhang, Richard. "Making convolutional networks shift-invariant again." In International conferencelearning, pp. 7324-7334. PMLR, 2019.

EP Search Report and Written Opinion for counterpart EP Appl. No. 23844716.3, report dated Jan. 26, 2026, 9 pgs.

Mark Sandler et al Non-Discriminative Data or Weak Model? on the Relative Importance of Data and Model Resolution arxiv.org, Cornell University Library, 201 Olin Library Cornell University Ithaca, NY 14853 (Sep. 7, 2019), XP081503253.

Jingdong Wang et al Deep High-Resolution Representation Learning for Visual Recognition arxiv.org, Cornell University Library, 201 Olin Library Cornell University Ithaca, NY 14853 (Aug. 20, 2019), XP081466932.

Tal Ridnik et al TResNet: High Performance GPU-Dedicated Architecture arxiv.org, Cornell University Library, 201 Olin Library Cornell University Ithaca, NY 14853 (Aug. 27, 2020), XP081748400.

Chen Hongyuan et al Super-Resolution Guided Knowledge Distillation for Low-Resolution Image Classification Pattern Recognition Letters, Elsevier, Amsterdam, NL, vol. 155, (Feb. 13, 2022), pp. 62-68, XP086994203 ISSN: 0167-8655, DOI: 10.1016/J.PATREC.2022.02.006.

* cited by examiner

SYSTEM AND METHOD TO UTILIZE A REDUCED IMAGE RESOLUTION FOR COMPUTER VISION APPLICATIONS

CROSS-REFERENCE TO RELATED APPLICATION(S)

This application claims priority to U.S. Provisional Patent Application No. 63/369,471 filed on Jul. 26, 2022, the contents of which are incorporated herein by reference in their entirety.

TECHNICAL FIELD

The following generally relates to computer vision applications, and more particularly to increasing the speed of such computer vision applications by utilizing a reduced image resolution.

BACKGROUND

Deep learning has emerged as one of the most disruptive technologies of recent times. Despite very high performance offered by deep learning algorithms, the use of deep learning can suffer from the problem of high computational complexities, which hinders its usage in small footprint devices. Using a lower input resolution for computer vision applications results in automatic speedup and reduction in complexity. However, the lower input resolution comes at the cost of loss in accuracy.

SUMMARY

It is found that most of computer vision applications do not need a standard resolution of images used to train state of the art models evaluated on open-source image datasets. Therefore, there is an opportunity to find an optimal image resolution for each application, with the optimal being less than the standard image sizes used in prior solutions. The following provides an automatic method of finding the optimal resolution for a specific dataset by keeping the number of trials to find the optimal resolution to a minimum. The reduced image resolution results in speedup of that application on all hardware platforms.

To provide an example, in a surveillance system, the disclosed methodology can be used to (1) determine an optimal resolution for training a model to be implemented on a security camera, the device processing the images from the security camera, etc., and (2) to train an updated model based on the optimized resolution, where the model can be implemented on target hardware. Continuing the example, the disclosed methodology can be used to determine an optimal resolution of an image to meet certain accuracy and latency when used with a reference model for identifying objects in the provided image. Once the optimal resolution is determined, the reference model can be updated with one or more additional components. These additional components operate such that the updated reference model, instead of ingesting the initial, larger, resolution image for processing, instead uses the additional components to manipulate the original image into a representation with the optimal resolution, after which the unaltered reference model components ingest the optimal resolution representation.

The disclosure potentially addresses problems associated with implementing image processing models on certain target hardware, as not all hardware environments have the resources that large scale technological company implementations do. That is, the disclosure relates to solving a technical problem lying within a computer, and/or defining a new way of operating a computer (e.g., including the computer(s) determining the optimal resolution, the updated model, and implementing the updated model) in a technical sense.

For example, in one example scenario, a factory may use certain cameras (or more generally image capture devices) to aid manufacturing operations (e.g., control a physical machine to stop in the event of a safety threshold is breached, to close doors in the event an intruder is detected, or alerts related thereto, etc.). In order to aid implementation, the factory can choose to use a pre-existing image processing model and adapt it to the factory camera hardware. Alternatively, the factory can generate a model which receives high resolution images, with the goal of reducing the model afterwards for the target hardware, while maintaining accuracy, to the extent possible. As set out below in examples, the factory can use the image processing model which receives relatively large images, take images having resolutions that coincide with the expected image resolution for that model, and further train and/or augment the model (generating the new model) into an updated model which receives lower resolution images. In some example embodiments, the updated model is generated by augmenting the first model with stems which learn which features of the high resolution image are retained. Another stem of the first model, during generation of the updated model, receives the corresponding low resolution image and learns important features therefrom. The generation process involves concatenating the learned features from both stems, and feeding these concatenated features through the model to train it into the updated model. The updated model therefore can learn features from both the high resolution image and the low resolution image. Afterwards, the updated model (the original model, with the stems removed), receives low resolution images and makes determinations on the basis of processing them.

In this way, technical challenges associated with the target hardware can be addressed through additional training of a high resolution image processing model. These technical challenges can result in better security, safer operation of a plant, etc. The disclosure is not restricted to factories, or particular applications; the disclosure can be used in various settings, including but not limited to in venues (e.g., to identify and monitor patrons or illegal entrants), within grocery stores (e.g., to identify food being purchased by individuals), etc. It is contemplated that the disclosure applies to all applications where cameras are used to, or provide guidance for systems that make physical changes based on the images captured by the cameras.

In another example, the factory can seek to determine which hardware is appropriate to purchase for the required implementation. The factory can train a model (pre-existing, or otherwise) with corresponding images of different resolutions. An evaluation process can determine which resolution provides the desired trade-off between latency and accuracy. The determined optimal resolution can then be used to determine satisfactory hardware for the factory operations.

In one aspect, a computer-implemented method for generating image processing models is disclosed. The method includes obtaining a reference model, a desired image resolution based on target hardware, and a training set of images comprising images with the desired image resolution and images with a higher resolution. The method includes generating an updated model by: iteratively training the reference model with a combined set of features, the combined set of features comprising features determined from the images with the higher resolution with at least one stem and features determined from the images with the desired resolution. The method includes outputting the trained updated model to the target hardware to process images with the desired image resolution.

In example embodiments, the at least one stem comprises one or more of a convolution structure, a pooling structure, and a space to depth structure.

In example embodiments, the at least one stem comprises two different convolution structures.

In example embodiments, the at least one stem comprises two different stems, or two identical stems. Each of the two stems can include of one or more of a convolution structure, a pooling structure, and a space to depth structure. Each of the stems can include different convolution structures. Features learned from each of the stems can be combined for use in training the updated reference model.

In example embodiments, the at least one stem comprises an instance of the space to depth structure outputting into an instance of the convolution structure.

In example embodiments, the at least one stem comprises an instance of the convolution structure outputting into an instance of the pooling structure.

In example embodiments, the at least one stem comprises an instance of the pooling structure outputting into an instance of and the convolution structure.

In example embodiments, the method further includes evaluating the reference model performance for different image resolutions during a training operation, and determining the desired image resolution based on the reference model performance during the evaluation, the desired image resolution defining characteristics of the target hardware.

In another aspect, a device comprising a processor and memory is disclosed. The memory includes computer executable instructions for generating image processing models. The instructions cause the processor to obtain a reference model, a desired image resolution based on target hardware, and a training set of images comprising images with the desired image resolution and images with a higher resolution. The instructions cause the processor to generate an updated model by: iteratively training the reference model with a combined set of features, the combined set of features including features determined from the images with the higher resolution with at least one stem and features determined from the images with the desired resolution. The instructions cause the processor to output the trained updated model to the target hardware to process images with the desired image resolution.

In example embodiments, the at least one stem comprises one or more of a convolution structure, a pooling structure, and a space to depth structure.

In example embodiments, the at least one stem comprises two different convolution structures.

In example embodiments, the at least one stem comprises two different stems, or two identical stems. Each of the two stems can include of one or more of a convolution structure, a pooling structure, and a space to depth structure. Each of the stems can include different convolution structures. Features learned from each of the stems can be combined for use in training the updated reference model.

In example embodiments, the at least one stem comprises an instance of the space to depth structure outputting into an instance of the convolution structure.

In example embodiments, the at least one stem comprises an instance of the convolution structure outputting into an instance of the pooling structure.

In example embodiments, the at least one stem comprises an instance of the pooling structure outputting into an instance of and the convolution structure.

In example embodiments, the instructions further cause the processor to evaluate the reference model performance for different image resolutions during a training operation, and determine the desired image resolution based on the reference model performance during the evaluation, the desired image resolution defining characteristics of the target hardware.

In another aspect, a computer readable medium comprising computer executable instructions for generating image processing models is disclosed. The instructions are for obtaining a reference model, a desired image resolution based on target hardware, and a training set of images comprising images with the desired image resolution and images with a higher resolution. The instructions are for generating an updated model by: iteratively training the reference model with a combined set of features, the combined set of features including features determined from the images with the higher resolution with at least one stem and features determined from the images with the desired resolution. The instructions are for outputting the trained updated model to the target hardware to process images with the desired image resolution.

BRIEF DESCRIPTION OF THE DRAWINGS

Embodiments will now be described with reference to the appended drawings wherein.

DETAILED DESCRIPTION

Deep learning models used in computer vision perform well at higher input resolutions and when the model capacity is high. Accuracy metrics start reducing when the system either reduces the input resolution and/or the model capacity. While the model capacity is needed when the model needs complex understanding of the problem (e.g., a high number of categories, semantically complex categories, etc.), most of the industrial and practical applications do not need a model to detect more than a few classes. For example, a surveillance application for apartments may need to detect only a few object categories like "person", "pet animal" and "car". Similarly automotive applications need to detect different types of vehicles, people, and animals. Most of the applications use a resolution that is either chosen based on empirical studies from academic literature or chosen using a limited set of experiments. To solve this issue, an algorithm has been developed to find an optimal resolution for a given task automatically, as follows.

First, one can divide the image resolutions into smaller bins divisible by 32. These bins fall in the range [0.4*$R_{org}$:$R_{org}$].

Second, the system proposes a way to find the optimal resolution $R_{opt}$ with model performance drop within a range (delta-d). Delta is the maximum accuracy drop that the application can afford, which can be as low as zero.

Third, the system uses Ropt_to add an auxiliary stem in the object detection pipeline which accepts the image with original resolution (Rorg) and uses one of the two stems to be the same as the original model accepting the resized input with scaling factor of (Ropt/Rorg).

In the present solution, the system can add another stem that accepts the input resolution Rorg_and it goes through a few layers before the output gets concatenated to stem 1.

The above architecture results in increase in mean average precision (mAP) by few points and speedup of around $(R_{org}/R_{opt})^2$.

As a next step, the system is configured to choose one or two bins lower based on the accuracy gain from the above operations and retrains the model with 2 stems to get an accuracy that is almost the same as the original model. This step would provide overall speedup of (Ropt−32)/Rorg with zero accuracy drop.

Context

The experiments are carried out using YOLOv5/v4 backbone [1]. Space2Depth was introduced by Mehdi et al. [2] which can be used to downscale input resolution. Zhang [5] proposed anti-aliasing by low-pass filtering before down sampling which improves detection performance. TResNet [3] is a variant on a ResNet that aims to boost accuracy while maintaining GPU training and inference efficiency. It includes multiple design choices including Space2Depth and Antialiasing. Through extensive ablation studies Sandler et al. [4] show that resolution in the first few layers does not matter that much as in the later layers.

Finding an Optimal Resolution

Figure 1:
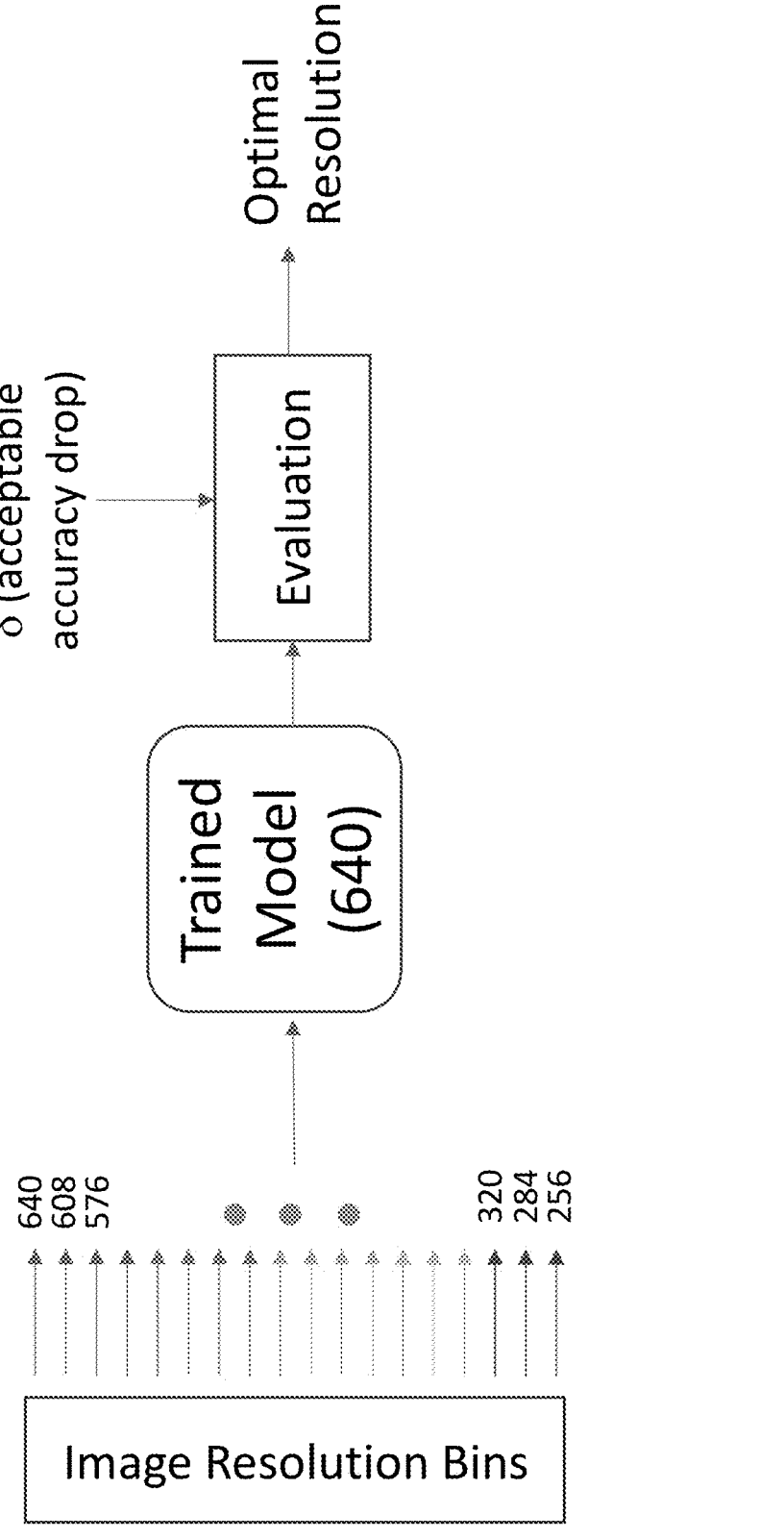
FIG. 1 is a block diagram for finding an optimal resolution.

The first step of finding the optimal resolution during model training is to create a resolution bin at an interval of 32 within the range of [0.4*$R_{org}$:$R_{org}$] as shown in FIG. 1. During model training, at each eval stage, the model is evaluated on all the resolution bins and the best accuracy within the allowed accuracy drop (delta) is recorded. After the end of the model training, the optimal resolution is selected from the eval results ($R_{opt}$).

Optimal Resolution Guided Model Architecture Change

To support the optimal resolution automatically, the system introduces some changes in the architecture of the model, which can be achieved by using different methods described in this section.

Two Stem Architecture Using S2D

Figure 2:
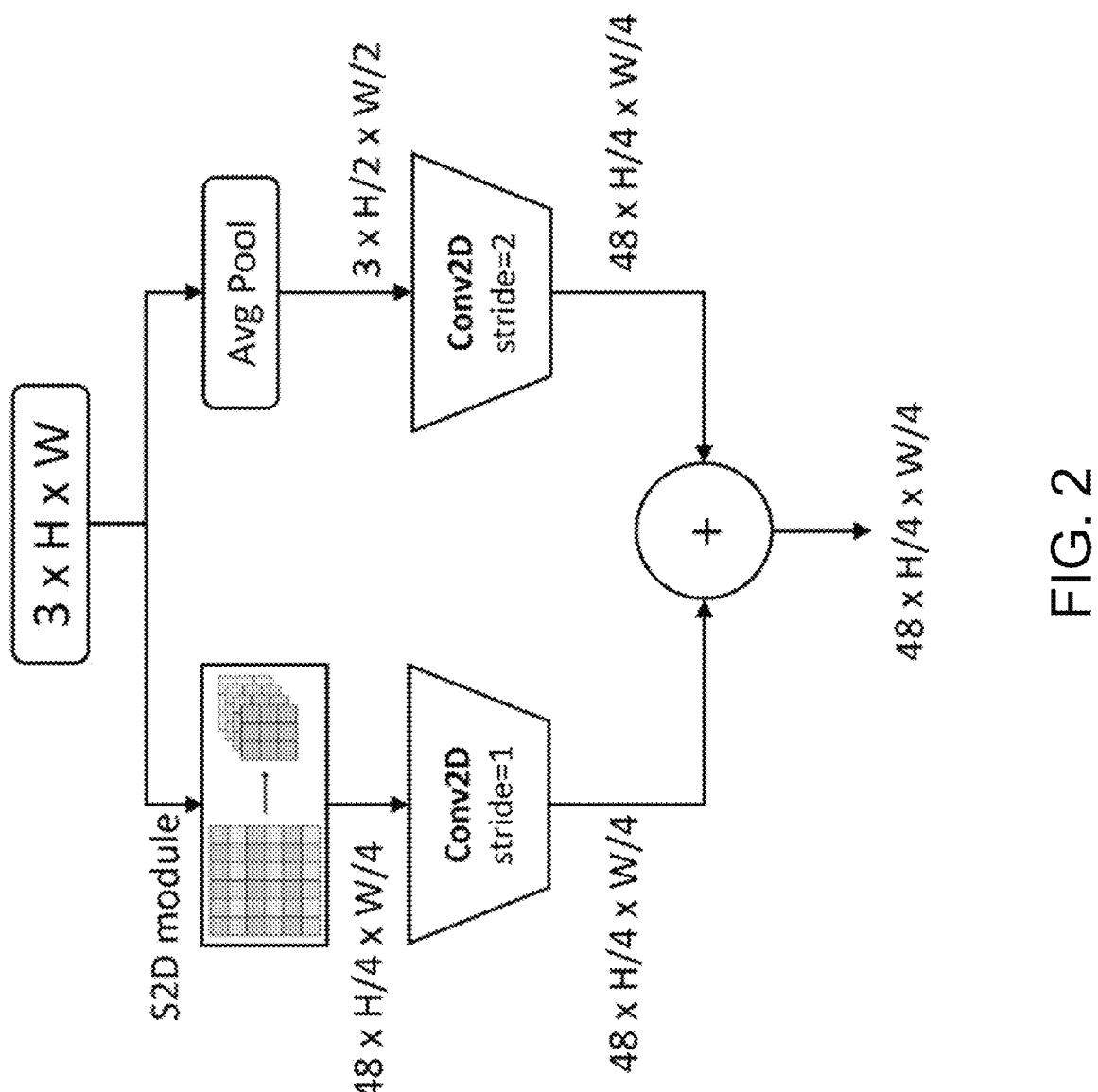
FIG. 2 is a flow chart illustrating a two stem architecture using S2D.

The two stem architecture shown in FIG. 2 uses an image of resolution H×W. Stem2 uses an average pool to convert the image to half the original resolution (H/2×W/2) followed by a convolution with a stride of 2 to get an output of N×H/4×W/4 (where N=48 is a width hyperparameter of the model). Stem1 uses a block called space to depth (S2D) which stacks an image with resolution (H×W) to increase the depth for an example, a single channel of image with H×W dimension will be converted to H/4×W/4 with number of channels as 16. Therefore, the total number of channels of the input image with 3 channels would become 3*16 (48). This output goes through a convolution layer with stride=1 to produce 48×H/4×W/4 output. The output from stem1 and stem2 are added in elementwise fashion and the rest of the network structure is kept the same. The rationale behind this approach is that instead of using a low-resolution input for a model to increase the speed (with a loss in accuracy), if the system adds an additional stem that uses a higher resolution image but goes through a sharp down sampling (using S2D), the system can get more information that would have been lost otherwise.

Two Stem Architecture Using Conv2D

Figure 3:
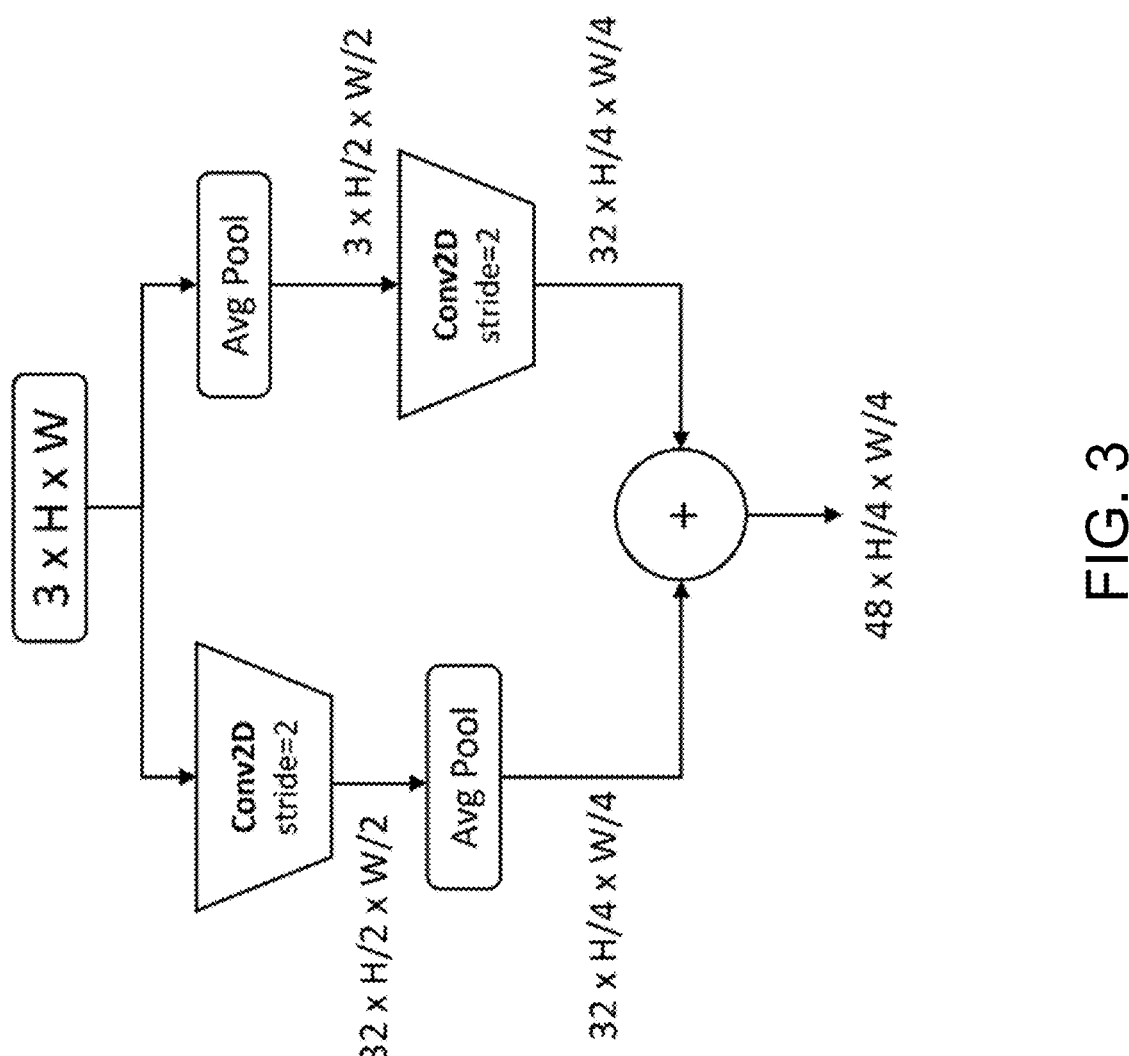
FIG. 3 is a flow chart illustrating a two stem architecture using Conv2D.

FIG. 3 shows how to apply a technique using a two stem architecture using Conv2D. This approach is a slight modification of S2D stem and instead of using S2D module followed by a Conv2D with stride 1 in stem1, first a Conv2D with stride 2 is applied which results in a tensor of size 32×H/2×W/2. Then, an average pooling layer with kernel size 2 is applied so that the final tensor from stem 1 is 32×H/4×W/4. The Conv2D in stem2 will have 32 output channels as well. In this design the Conv2D in stem1 is applied to a larger resolution image, which gives the model the opportunity to extract features from that scale.

Two Identical Stems with Sharp Down-Sampling

Figure 4:
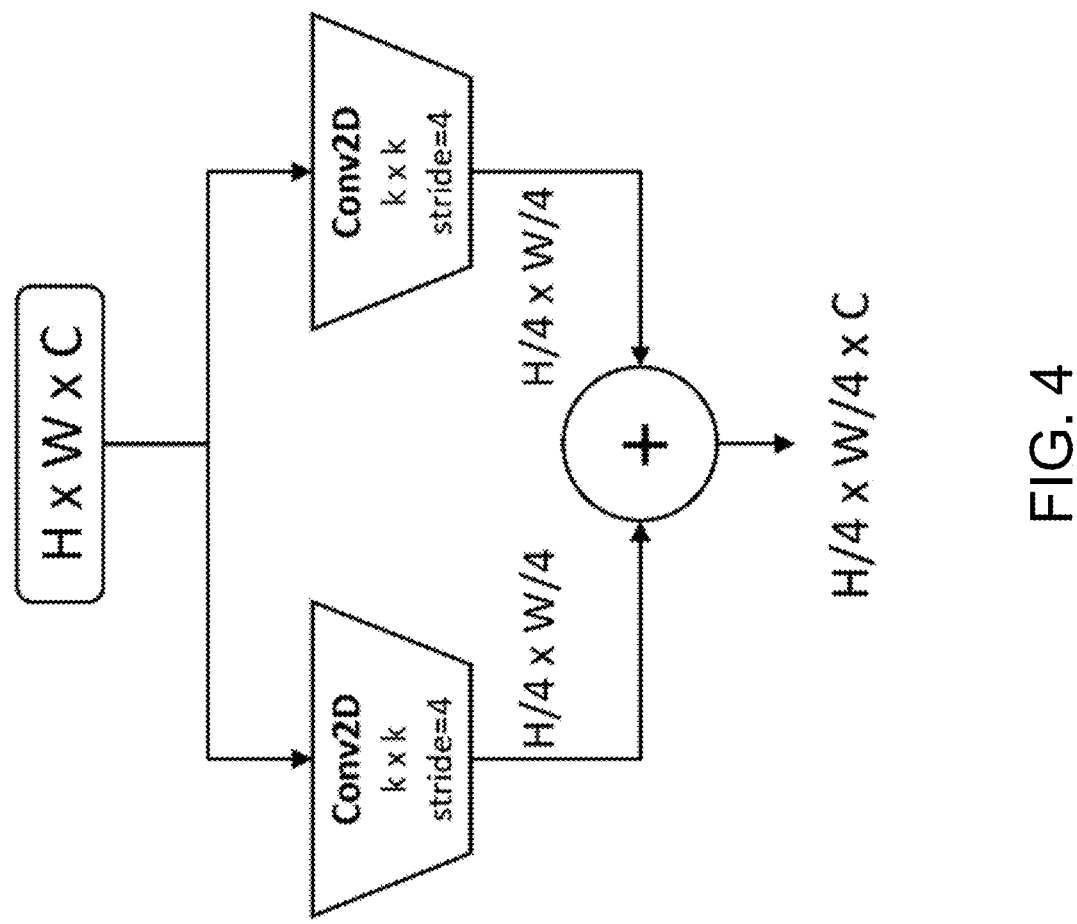
FIG. 4 is a flow chart illustrating two identical stems with sharp down sampling.

The architecture shown in FIG. 4 was used to verify whether the accuracy gain is coming from two stems or due to sharp down-sampling. Both stems have a convolution with a stride of 4 to convert the input resolution from H×W to H/4×W/4. The output of both stems is added bitwise to send the output to the next layer.

Single Stem with Sharp Down-Sampling and 1×1 Conv

Figure 5:
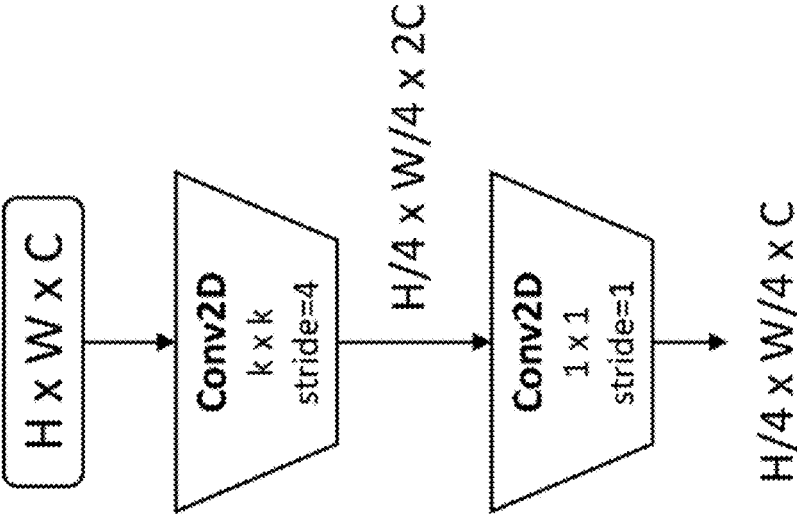
FIG. 5 is a flow chart illustrating a single stem with sharp down sampling following by a 1×1 Conv.

The architecture shown in FIG. 5 verifies that for many datasets and models, the accuracy gain can be achieved by a single stem with sharp down sampling followed by a 1×1 layer.

Results

All the benchmarking results shown in Tables 1 and 2 below are from yolo5s model and trained and evaluated on a subset of coco dataset with 8 classes (person, dog, cat, car, bus, truck, motorcycle, and bicycle). All of the models are trained from scratch (no pretrained model is used) to ensure that all the performance results are comparable without any bias.

TABLE 1

| Benchmarking of Yolo5s Model Using Different Architectures on Input Resolution 320 | | | | | | |
|---|---|---|---|---|---|---|
| Exp | Input resolution | Stem1 | Stem2 | MAP@0.5 | CPU time (ms) | GPU time (ms) |
| Yolov5s | 320 | NA | NA | 53.94 | 352.45 | 61.11 |
| Yolov5s | 160 | | | 37.0 | 105.54 | 22.82 |
| Yolov5s 2stem-avgpool_160 | 320* | conv(s = 4) | avgpool(2 × 2) -> conv(s = 2 ) | 40.59 | 113.53 | 24.14 |
| Yolov5s-2stem-maxblurpool_320 | 320* | conv(s = 4) | maxblurpool(2 × 2) -> conv(s = 2) | 40.98 | 113.27 | 24.88 |
| Yolov5s-2stem-conv_320 | 320* | conv(s = 4) | conv(s = 4) | 40.4 | 112.24 | 23.809 |

TABLE 1-continued

Benchmarking of Yolo5s Model Using Different Architectures on Input Resolution 320

| Exp | Input resolution | Stem1 | Stem2 | MAP@0.5 | CPU time (ms) | GPU time (ms) |
|---|---|---|---|---|---|---|
| Yolov5s-2stem-conv_sa_320 | 320* | conv(s = 4) -> conv(1 × 1) | conv(s = 4) -> conv(1 × 1) | 41.61 | 129.82 | 35.93 |
| Yolov5s-conv-2x-channels_320 | 320* | conv(s = 4) *2C -> conv(1 × 1) | conv(s = 4) *2C -> conv(1 × 1) | 41.57 | 115.27 | 23.77 |

TABLE 2

Benchmarking of Yolo5s Model Using Different Architectures on Input Resolution 448

| Exp | Input resolution | Stem1 | Stem2 | MAP@0.5 | CPU time (ms) | GPU time (ms) |
|---|---|---|---|---|---|---|
| Yolov5s | 448 | NA | NA | 58.8 | 683 | 112 |
| Yolov5s | 480 | NA | NA | 60.9 | 772 | 129 |
| Yolov5s 2stem-interpolate | 640 | Upsample --> 896 Conv (S = 2, K = 3) Maxpool (K = 2) | Interpolate --> 448 Conv (S = 2, K = 3) | 59.8 | 781 | 139 |
| Yolov5s 2stem-interpolate | 640 | Upsample --> 896 Conv (S = 4, K = 7) | Interpolate --> 448 Conv (S = 2, K = 6) | 60.2 | 931 | 157 |
| Final single stem model | 896 (actual is going to be half this) | Conv (S = 2, K = 7, c2 = 64) Maxpool (K = 2) Conv1 × 1(c2 = 32) | N/A | 60.6 | 768 | 126 |

It may be noted that for these tables, the resolution noted is used as the input of the model but the effective resolution would be half of the actual resolution.

CONCLUSION

The proposed solution addresses two different aspects of object detection performance, namely i) finding the optimal resolution for better latency, and ii) proposing changes in the models for better accuracy. The resolution for inference directly impacts the latency of the models, but in industrial use cases, this resolution is decided without any structured experiments. The above proposes a framework to find the optimal resolution for inference of the models which will give the lowest inference time given delta accuracy difference from the original resolution model.

For finding the changes in the architecture, multiple experiments were conducted including single stem and two stem architectures. The fundamental idea is to extract more information from the same image using different operations. For two stem architectures, two different approaches were attempted, one with S2D auxiliary stem, and one with Conv2D auxiliary stem. The Conv2D auxiliary stem produced better accuracy than S2D in most of the experiments.

It was found that the accuracy gain achieved by a single stem with sharp down sampling followed by a 1×1 layer is equivalent or sometimes better than the 2 stem approaches.

A combination of both accuracy and latency aspects to a given object detection model can improve performance and help save costs at large scale applications.

Figure 6:
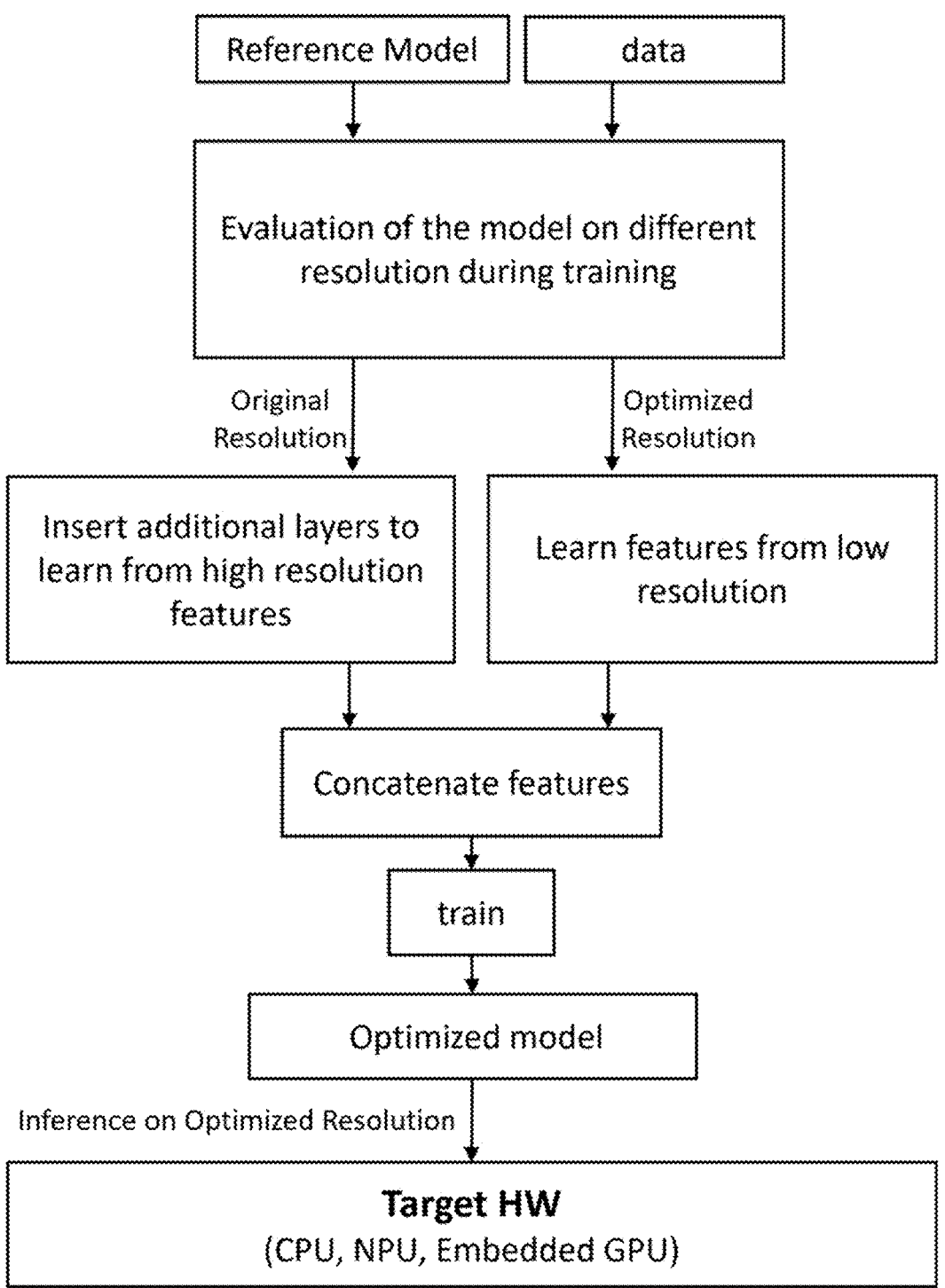
FIG. 6 is a flow chart illustrating a process for generating an optimized model for a target hardware system.

Referring now to FIG. 6, the proposed solution in an application is summarized. With the reference model and data as inputs, the system evaluates the model on different resolutions (e.g., the resolution bin intervals discussed above) during training. This produces an optimized resolution which can be used along with the original resolution in the next stage. The original resolution is used to insert additional layers to learn from the high resolution features, while the optimized resolution is used to learn features from the low(er) resolution. The features learned in these operations are then concatenated and used to train an optimized model as discussed above. The optimized model can be used by a target hardware, such as a CPU, NPU, embedded GPU, etc. to make inferences on the optimized resolution. The process shown in FIG. 6 can be adapted for different applications, different computing environments, and/or different hardware types to utilize the optimal resolution in various systems and devices.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory computer readable medium which can be used to store the desired information and which can be accessed by an application, module, or both. Any such computer storage media may be part of the system, any component of or related thereto, etc., or accessible or connectable thereto. Any application or module herein described may be implemented using computer readable/ executable instructions that may be stored or otherwise held by such computer readable media.

The steps or operations in the flow charts and diagrams described herein are provided by way of example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as having regard to the appended claims in view of the specification as a whole.

REFERENCES

[1] Bochkovskiy, Alexey, Chien-Yao Wang, and Hong-Yuan Mark Liao. "Yolov4: Optimal speed and accuracy of object detection." arXiv preprint arXiv:2004.10934 (2020).

[2] Sajjadi, Mehdi S M, Raviteja Vemulapalli, and Matthew Brown. "Frame-recurrent video super-resolution." In *Proceedings of the IEEE Conference on Computer Vision and Pattern Recognition*, pp. 6626-6634. 2018.

[3] Ridnik, Tal, Hussam Lawen, Asaf Noy, Emanuel Ben Baruch, Gilad Sharir, and Itamar Friedman. "Tresnet: High performance gpu-dedicated architecture." In *Proceedings of the IEEE/CVF Winter Conference on Applications of Computer Vision*, pp. 1400-1409. 2021.

[4] Sandler, Mark, Jonathan Baccash, Andrey Zhmoginov, and Andrew Howard. "Non-discriminative data or weak model? on the relative importance of data and model resolution." In *Proceedings of the IEEE/CVF International Conference on Computer Vision Workshops*, pp. 0-0. 2019.

[5] Zhang, Richard. "Making convolutional networks shift-invariant again." In *International conference on machine learning*, pp. 7324-7334. PMLR, 2019.

The invention claimed is:

1. A computer-implemented method for generating image processing models, the method comprising:

obtaining a reference model, an optimal image resolution selected from:

a plurality of resolution bins, each corresponding to an image resolution divisible by 32 within a range from 0.4 times an original image resolution to the original image resolution, the optimal image resolution selection being based on an accuracy evaluation for a specified hardware profile, wherein the optimal image resolution is a lowest resolution bin for which an accuracy metric does not decrease by more than a predefined threshold compared to the accuracy at the original image resolution, the specified hardware profile comprising at least one of a central processing unit (CPU), a neural processing unit (NPU), and embedded graphical processing unit (GPU); and a training set of images comprising images with the optimal image resolution and images with an image resolution greater than the optimal image resolution, wherein greater indicates a bin with a higher pixel count than the optimal image resolution;

generating an updated model by: iteratively training the reference model with a combined set of features, the combined set of features comprising features determined from the images with the resolution greater than the optimal image resolution with at least one stem and features determined from the images with the optimal image resolution, wherein the at least one stem comprises one or more of a convolution structure, a pooling structure, and a space to depth structure; and outputting the updated model for deployment on the specified hardware profile to process images with the optimal image resolution.

2. The method of claim 1, wherein the at least one stem comprises two different convolution structures.

3. The method of claim 1, wherein the at least one stem comprises two different stems, or two identical stems, each of the two different stems comprising one or more of a convolution structure, a pooling structure, and a space to depth structure each of the two identical stems comprising one or more of a convolution structure, a pooling structure, and a space to depth structure.

4. The method of claim 1, wherein the at least one stem comprises an instance of the space to depth structure outputting into an instance of the convolution structure.

5. The method of claim 1, wherein the at least one stem comprises an instance of the convolution structure outputting into an instance of the pooling structure.

6. The method of claim 1, wherein the at least one stem comprises an instance of the pooling structure outputting into an instance of the convolution structure.

7. The method of claim 3, wherein features learned from each of the stems are combined for use in training the updated reference model.

8. The method of claim 1, further comprising:

evaluating the reference model performance for different image resolutions during a training operation; and determining the optimal image resolution based on the reference model performance during the evaluation, the optimal image resolution defining characteristics of the target hardware.

9. A device comprising a processor and memory, the memory comprising computer executable instructions for generating image processing models, the instructions causing the processor to:

obtain a reference model, an optimal image resolution selected from:

a plurality of resolution bins, each corresponding to an image resolution divisible by 32 within a range from 0.4 times an original image resolution to the original image resolution, the optimal image resolution selection being based on an accuracy evaluation for a specified hardware profile, wherein the optimal image resolution is a lowest resolution bin for which an accuracy metric does not decrease by more than a predefined threshold compared to the accuracy at the original image resolution, the specified hardware profile comprising at least one of a central processing unit (CPU), a neural processing unit (NPU), and embedded graphical processing unit (GPU); and a training set of images comprising images with the optimal image resolution and images with an image resolution greater than the optimal image resolution, wherein greater indicates a bin with a higher pixel count than the optimal image resolution;

generate an updated model by: iteratively training the reference model with a combined set of features, the combined set of features comprising features determined from the images with the image resolution greater than the optimal image resolution with at least one stem and features determined from the images with the optimal image resolution, wherein the at least one stem comprises one or more of a convolution structure, a pooling structure, and a space to depth structure; and output the updated model for deployment on the specified hardware profile to process images with the optimal image resolution.

10. The device of claim 9, wherein the at least one stem comprises two different convolution structures.

11. The device of claim 9, wherein the at least one stem comprises two different stems, or two identical stems, each of the two different stems comprising one or more of a convolution structure, a pooling structure, and a space to depth structure, each of the two identical stems comprising one or more of a convolution structure, a pooling structure, and a space to depth structure.

12. The device of claim 11, wherein features learned from each of the two or more stems are combined for use in training the updated reference model.

13. The device of claim 9, wherein the at least one stem comprises two stems, each of the two stems comprising one or more of a convolution structure, a pooling structure, and a space to depth structure.

14. The device of claim 13, wherein at least one of the stems comprises an instance of the space to depth structure outputting into an instance of the convolution structure.

15. The device of claim 9, the instructions causing the processor to:

evaluate the reference model performance for different image resolutions during a training operation; and determine the optimal image resolution based on the reference model performance during the evaluation, the optimal image resolution defining characteristics of the target hardware.

16. A non-transitory computer readable medium comprising computer executable instructions for generating image processing models, the instructions for:

obtain a reference model, a desired image resolution selected from:

a plurality of resolution bins, each corresponding to an image resolution divisible by 32 within a range from 0.4 times an original image resolution to the original image resolution, the optimal image resolution selection being based on an accuracy evaluation for a specified hardware profile, wherein the optimal image resolution is a lowest resolution bin for which an accuracy metric does not decrease by more than a predefined threshold compared to the accuracy at the original image resolution, the specified hardware profile comprising at least one of a central processing unit (CPU), a neural processing unit (NPU), and embedded graphical processing unit (GPU); and a training set of images comprising images with the optimal image resolution and images with an image resolution greater than the optimal image resolution, wherein greater indicates a bin with a higher pixel count than the optimal image resolution;

generate an updated model by: iteratively training the reference model with a combined set of features, the combined set of features comprising features determined from the images with the higher resolution with at least one stem and features determined from the images with the optimal image resolution, wherein the at least one stem comprises one or more of a convolution structure, a pooling structure, and a space to depth structure; and output the trained updated model for deployment on the specified hardware profile hardware to process images with the optimal image resolution.

* * * * *